(12) United States Patent
Kido et al.

(10) Patent No.: US 12,525,998 B2
(45) Date of Patent: Jan. 13, 2026

(54) MULTIPLEXER, RADIO-FREQUENCY MODULE, AND COMMUNICATION APPARATUS

(71) Applicant: Murata Manufacturing Co., Ltd., Nagaokakyo (JP)

(72) Inventors: Syunsuke Kido, Nagaokakyo (JP); Hirotsugu Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 350 days.

(21) Appl. No.: 18/301,995

(22) Filed: Apr. 18, 2023

(65) Prior Publication Data

US 2023/0253989 A1    Aug. 10, 2023

Related U.S. Application Data

(63) Continuation of application No. PCT/JP2021/032737, filed on Sep. 6, 2021.

(30) Foreign Application Priority Data

Oct. 23, 2020   (JP) ................. 2020-177772

(51) Int. Cl.
  *H04B 1/00*   (2006.01)
  *H04B 1/16*   (2006.01)
(52) U.S. Cl.
  CPC ........... *H04B 1/0057* (2013.01); *H04B 1/163* (2013.01)
(58) Field of Classification Search
  CPC ..................... H04B 1/0057; H04B 1/163
  See application file for complete search history.

(56) References Cited

U.S. PATENT DOCUMENTS 7,834,720 B2 * 11/2010 Timme .................. H03H 9/605
                                                333/187
10,886,895 B2 *  1/2021 Tani ......................... H04B 1/40
(Continued)

FOREIGN PATENT DOCUMENTS

JP     2010-21914 A    1/2010
JP    2019-186937 A   10/2019
(Continued)

OTHER PUBLICATIONS

Procedure for the Design of Ladder Baw Filters Taking Electrodes Into Account O. Men'endez, P. de Paco, E. Corrales, and J. Verd'u—Progress In Electromagnetics Research Letters, vol. 7, 127-137, 2009.*

(Continued)

*Primary Examiner* — Edan Orgad
(74) *Attorney, Agent, or Firm* — XSENSUS LLP

(57) ABSTRACT

A multiplexer includes first, second, and third filters. The first filter has a first pass band including a first band to send a signal. The second filter has a second pass band including a second band to send a signal. The third filter has a third pass band including a third band. An unwanted frequency of a second-order or fourth-order distortion mode, generated when a first transmitted signal of the first band and a second transmitted signal of the second band are simultaneously transmitted, is included in at least one of the first, second, and third pass bands. An unwanted frequency of a third-order distortion mode, generated when the first transmitted signal and the second transmitted signal are simultaneously transmitted, is included in at least one of the first, second, and third pass bands. The first filter is a BAW filter. The second filter is a SAW filter.

19 Claims, 7 Drawing Sheets

(56) References Cited

U.S. PATENT DOCUMENTS

| | | | | |
|---|---|---|---|---|
| 11,658,688 | B2* | 5/2023 | Abbott | H03H 9/706 |
| | | | | 333/186 |
| 2008/0252398 | A1* | 10/2008 | Jamneala | H03H 9/60 |
| | | | | 333/189 |
| 2010/0164645 | A1* | 7/2010 | Kobayashi | H03F 3/195 |
| | | | | 333/32 |
| 2016/0127015 | A1* | 5/2016 | Wloczysiak | H04B 7/08 |
| | | | | 375/219 |
| 2020/0028493 | A1* | 1/2020 | Ta | H03H 7/1766 |
| 2020/0280303 | A1* | 9/2020 | Takamine | H03H 9/6479 |
| 2021/0211146 | A1* | 7/2021 | Park | H04B 1/0057 |
| 2021/0288676 | A1* | 9/2021 | Zhang | H04B 1/0067 |
| 2022/0116010 | A1* | 4/2022 | Hey-Shipton | H03H 9/568 |

FOREIGN PATENT DOCUMENTS

| | | |
|---|---|---|
| JP | 2020-14204 A | 1/2020 |
| JP | 2020-102814 A | 7/2020 |
| WO | 2020/129470 A1 | 6/2020 |

OTHER PUBLICATIONS

International Search Report and Written Opinion mailed on Nov. 16, 2021, received for PCT Application PCT/JP2021/032737, filed on Sep. 6, 2021, 8 pages including English Translation.

* cited by examiner

MULTIPLEXER, RADIO-FREQUENCY MODULE, AND COMMUNICATION APPARATUS

CROSS-REFERENCE TO RELATED APPLICATIONS

This is a continuation application of PCT International Application No. PCT/JP2021/032737, filed on Sep. 6, 2021, which is based on and claims priority to Japanese Patent Application No. 2020-177772, filed on Oct. 23, 2020. The entire disclosures of the above-identified applications, including the specifications, drawings, and claims are incorporated herein by reference in their entirety.

BACKGROUND

1. Field

The present disclosure relates to a multiplexer, a radio-frequency module, and a communication apparatus.

2. Description of the Related Art

It is desirable that a multiband- and multimode-support radio-frequency circuit send and receive multiple radio-frequency signals with a small loss and a high isolation.

U.S. Patent Application Publication No. 2016/0127015 discloses a receiver module (multiplexer) in which multiple filters whose pass bands are different from each other are connected to an antenna via a switch.

SUMMARY

The recent versions of 3GPP (Third Generation Partnership Project) specify simultaneous transmission of radio-frequency signals of multiple bands including 5G (5th generation)-NR (New Radio) bands. Combinations of bands to be simultaneously transmitted thus become diversified. It is anticipated that there will be more cases in which signal distortion occurs depending on the frequency to be used and the quality of a transmitted signal or a received signal is degraded. Examples of major modes of signal distortion that degrade the quality of a transmitted signal or a received signal are the second-, third-, and fourth-order distortion modes. It is thus desirable to reduce the occurrence of unwanted waves of multiple major distortion modes (second-, third-, and fourth-order distortion modes) rather than to reduce unwanted waves of a single specific distortion mode to suppress the degradation of the quality of a transmitted signal or a received signal.

An aspect of the present disclosure to provide a multiplexer, a radio-frequency module, and a communication apparatus that are capable of reducing the occurrence of unwanted waves of multiple major distortion modes.

According to an aspect of the disclosure, there is provided a multiplexer including first, second, and third filters. The first filter is connected to a common terminal and has a first pass band including a first band to send a signal. The second filter is connected to the common terminal and has a second pass band including a second band. The second band is positioned at a lower frequency side than the first band to send a signal. The third filter is connected to the common terminal and has a third pass band including a third band. The frequency of an unwanted wave of a second- or fourth-order distortion mode, which is generated when a first transmitted signal of the first band and a second transmitted signal of the second band are simultaneously transmitted, is included in at least one of the first pass band, the second pass band, and the third pass band. The frequency of an unwanted wave of a third-order distortion mode, which is generated when the first transmitted signal of the first band and the second transmitted signal of the second band are simultaneously transmitted, is included in at least one of the first pass band, the second pass band, and the third pass band. The first filter is a bulk acoustic wave filter. The second filter is a surface acoustic wave filter.

According to an aspect of the disclosure, it is possible to provide a multiplexer, a radio-frequency module, and a communication apparatus that are capable of reducing the occurrence of unwanted waves of multiple major distortion modes.

DETAILED DESCRIPTION

Figure 1:
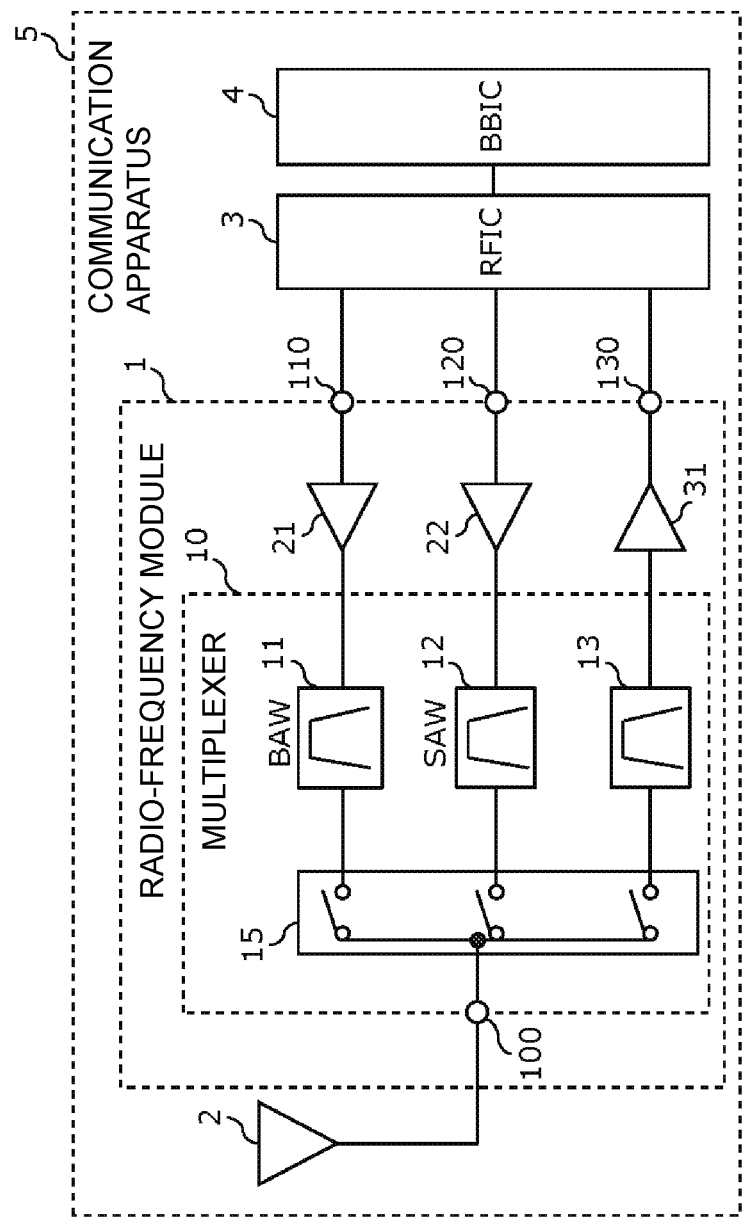
FIG. 1 is a circuit block diagram of a multiplexer, a radio-frequency module, and a communication apparatus according to an exemplary embodiment.

Exemplary embodiments of the disclosure will be described below in detail with reference to the accompanying drawings. The exemplary embodiments described below illustrate general or specific examples. Numerical values, configurations, materials, components, and positions and connection states of the components illustrated in the following exemplary embodiments are only examples and do not limit the scope of the disclosure.

The drawings are only schematically shown and are not necessarily precisely illustrated. For the sake of representation, the drawings are illustrated in an exaggerated manner or with omissions or the ratios of components in the drawings are adjusted. The configurations, positional relationships, and ratios of components in the drawings may be different from those of the actual components. In the drawings, substantially identical components are designated by like reference numeral, and an explanation of such components may not be repeated or may be simplified in subsequent references to the components.

In the disclosure, "A is connected to B" includes, not only the meaning that A is directly connected to B using a connecting terminal and/or a wiring conductor, but also the meaning that A is electrically connected to B via another circuit element. "Being connected between A and B" means that "being connected to both A and B on a path which connects A and B".

1. Circuit Configurations of Multiplexer 10, Radio-Frequency Module 1, and Communication Apparatus 5

FIG. 1 is a circuit block diagram of a multiplexer 10, a radio-frequency module 1, and a communication apparatus 5 according to the exemplary embodiment. As illustrated in FIG. 1, the communication apparatus 5 includes the radio-frequency module 1, an antenna 2, a radio-frequency (RF) signal processing circuit 3, and a baseband signal processing circuit 4. Hereinafter, the radio-frequency (RF) signal processing circuit 3 will be called a radio-frequency integrated circuit (RFIC) 3, and the baseband signal processing circuit 4 will be called a baseband integrated circuit (BBIC) 4. The radio-frequency module 1 transmits a radio-frequency signal between the antenna 2 and the RFIC 3. The detailed circuit configuration of the radio-frequency module 1 will be discussed later.

The antenna 2 is connected to an antenna connecting terminal 100 of the radio-frequency module 1. The antenna 2 sends a radio-frequency signal output from the radio-frequency module 1 and also receives a radio-frequency signal from an external source and outputs it to the radio-frequency module 1.

The RFIC 3 is an example of a signal processing circuit that processes a radio-frequency signal. The RFIC 3 will be discussed below more specifically. The RFIC 3 performs signal processing, such as down-conversion, on a radio-frequency received signal which is received via a receive path of the radio-frequency module 1 and outputs the resulting received signal to the BBIC 4. The RFIC 3 also performs signal processing, such as up-conversion, on a transmitted signal received from the BBIC 4 and outputs the resulting radio-frequency transmitted signal to a transmit path of the radio-frequency module 1. The RFIC 3 includes a controller that controls components, such as a switch and amplifiers, of the radio-frequency module 1. All or some of the functions of the RFIC 3 as the controller may be installed in a source outside the RFIC 3, such as in the BBIC 4 or the radio-frequency module 1.

The BBIC 4 is a baseband signal processing circuit that performs signal processing by using an intermediate-frequency band, which is lower than a radio-frequency signal transmitted by the radio-frequency module 1. Examples of signals to be processed by the BBIC 4 are image signals for displaying images and/or audio signals for performing communication via a speaker.

The antenna 2 and the BBIC 4 are not essential components for the communication apparatus 5 of the exemplary embodiment. As such, the antenna 2 and the BBIC 4 may be omitted without departing from the scope of the present disclosure.

The detailed circuit configuration of the radio-frequency module 1 will now be discussed below. As illustrated in FIG. 1, the radio-frequency module 1 includes the multiplexer 10, power amplifiers 21 and 22, a low-noise amplifier 31, radio-frequency input terminals 110 and 120, and a radio-frequency output terminal 130.

The radio-frequency input terminals 110 and 120 are terminals for receiving a radio-frequency transmitted signal from the outside of the radio-frequency module 1. The radio-frequency output terminal 130 is a terminal for outputting a radio-frequency received signal to the outside of the radio-frequency module 1.

The multiplexer 10 is disposed between the antenna 2 and the RFIC 3. The multiplexer 10 separates received signals input from the antenna 2 from each other and combines transmitted signals input from the RFIC 3. The multiplexer 10 includes filters 11, 12, and 13, a switch 15, and the antenna connecting terminal 100.

The antenna connecting terminal 100 is an example of a common terminal and is connected to the antenna 2 and to the switch 15.

The filter 11 is an example of a first filter. The filter 11 is connected to the antenna connecting terminal 100 via the switch 15 and has a first pass band including a first band which can be used for sending a signal.

The filter 12 is an example of a second filter. The filter 12 is connected to the antenna connecting terminal 100 via the switch 15. The filter 12 has a second pass band including a second band which is positioned at a lower frequency side than the first band and which can be used for sending a signal.

The filter 13 is an example of a third filter. The filter 13 is connected to the antenna connecting terminal 100 via the switch 15 and has a third pass band including a third band.

The frequency of the third band may be positioned between the second band and the first band, though this is not essential. The frequency of the third band may be positioned at locations other than between the first and second bands without departing from the scope of the present disclosure.

Each of the first, second, and third bands refers to a frequency band defined by a standards organization (such as 3GPP and Institute of Electrical and Electronics Engineers (IEEE)) for a communication system to be constructed using a radio access technology (RAT). In the embodiment, as the communication system, a long term evolution (LTE) system, a 5G-NR system, and a wireless local area network (WLAN) system, for example, may be used. However, the communication system is not limited to these types of systems.

The switch 15 has three single pole single throw (SPST) switch elements. One of the terminals of each of the switch elements is connected to the antenna connecting terminal 100. The other respective terminals of the switch elements are connected to the filters 11, 12, and 13. With this configuration, based on a control signal from the RFIC 3, for example, the switch 15 selectively connects or disconnects the antenna connecting terminal 100 to or from the filter 11, selectively connects or disconnects the antenna connecting terminal 100 to or from the filter 12, and selectively connects or disconnects the antenna connecting terminal 100 to or from the filter 13. The number of switch elements of the switch 15 is suitably set in accordance with the number of filters of the multiplexer 10.

The power amplifier 21 is an example of a first power amplifier. The power amplifier 21 is connected between the filter 11 and the radio-frequency input terminal 110 and is able to amplify a transmitted signal of the first band input from the radio-frequency input terminal 110.

The power amplifier 22 is an example of a second power amplifier. The power amplifier 22 is connected between the filter 12 and the radio-frequency input terminal 120 and is able to amplify a transmitted signal of the second band input from the radio-frequency input terminal 120.

The low-noise amplifier 31 is connected between the filter 13 and the radio-frequency output terminal 130. The low-noise amplifier 31 is able to amplify a received signal input from the antenna connecting terminal 100 and output from the filter 13.

In the multiplexer 10, the provision of the switch 15 may be omitted. In this case, the filters 11, 12, and 13 may be directly connected to the antenna connecting terminal 100.

An impedance matching circuit may be inserted between the filter 11 and the power amplifier 21, between the filter 12 and the power amplifier 22 and/or between the filter 13 and the low-noise amplifier 31. An impedance matching circuit may be inserted between the antenna connecting terminal 100 and the filter 11, between the antenna connecting terminal 100 and the filter 12, and/or between the antenna connecting terminal 100 and the filter 13.

2. Structure of Multiplexer 10

The structures of the filters 11, 12, and 13 forming the multiplexer 10 will be explained below.

The filter 11 is an example of a bulk acoustic wave (BAW) filter and includes one or more BAW resonators. The filter 12 is an example of a surface acoustic wave (SAW) filter and includes one or more SAW resonators. The filter 13 may be any one of a SAW filter, a BAW filter, an LC resonance filter using an inductor and a capacitor, a hybrid filter using an acoustic wave resonator, an inductor, and a capacitor, and a dielectric filter. The filter 13 may be a filter other than these types of filters.

Figure 2:
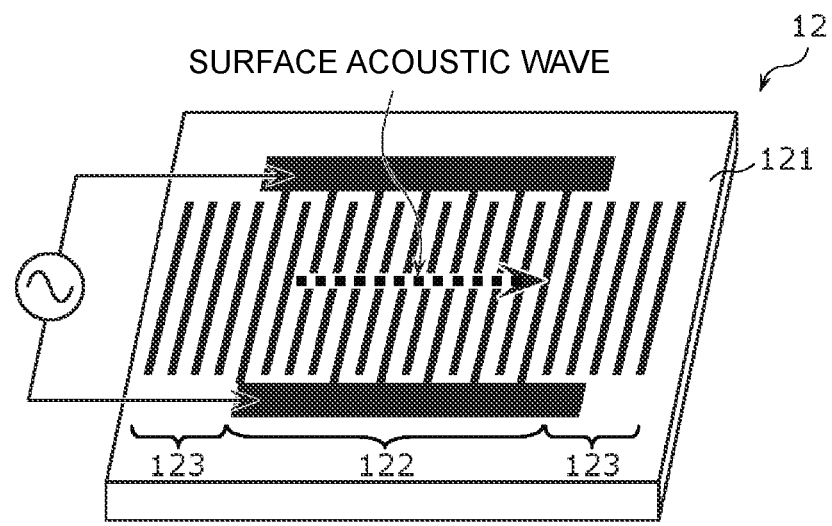
FIG. 2 is a schematic perspective view illustrating the structure of a second filter of the exemplary embodiment.

FIG. 2 is a schematic perspective view illustrating the structure of the filter 12 of the exemplary embodiment. The SAW resonator shown in FIG. 2 is one of one or more SAW resonators forming the filter 12. The SAW resonator illustrated in FIG. 2 is merely for explaining the typical structure of a SAW resonator, and the number and the length of electrode fingers forming the electrode are not limited to those shown in FIG. 2. The SAW resonator includes a piezoelectric substrate 121, a comb-shaped interdigital transducer (IDT) electrode 122 (hereinafter simply called the IDT electrode 122), and reflectors 123.

On the piezoelectric substrate 121, the IDT electrode 122 constituted by a pair of comb-shaped electrodes opposing each other is formed. Each of the comb-shaped electrodes is constituted by plural electrode fingers parallel with each other and a busbar electrode connecting the plural electrode fingers. A protection layer may be formed to cover the IDT electrode 122. The protection layer is provided for various purposes, such as protecting the IDT electrode 122 from external environments, adjusting the frequency-temperature characteristics, and enhancing the moisture resistance. The protection layer is made of a silicon dioxide as a main constituent, for example.

The piezoelectric substrate 121 is made of a single crystal, such as a lithium tantalate single crystal or a lithium niobate single crystal cut at predetermined cut angles, or made of ceramics. A SAW propagates through the single crystal or the ceramics forming the piezoelectric substrate 121 in a predetermined direction.

The piezoelectric substrate 121 is not necessarily formed of a single layer, but may alternatively be a multilayer substrate. For example, the piezoelectric substrate 121 may be constituted by a high acoustic velocity support substrate, a low acoustic velocity film, and a piezoelectric film stacked on each other in this order.

With the above-described configuration, when a radio-frequency signal is input between the pair of comb-shaped electrodes forming the IDT electrode 122, a potential difference is generated between the pair of comb-shaped electrodes. This causes the piezoelectric substrate 121 to distort so as to generate a SAW. The wavelength of the IDT electrode 122 (as twice as the pitch between electrode fingers) and the wavelength of the pass band of the filter 12 are preset to substantially match each other. This allows a radio-frequency signal only having target frequency components to pass through the filter 12.

A SAW propagates along the surface of the piezoelectric substrate 121 or along the interface of multiple materials. SAWs include various types of acoustic waves that can be generated using the IDT electrode 122. SAWs include surface acoustic waves, Love waves, leaky waves, Rayleigh waves, boundary waves, leaky SAWs, pseudo-SAWs, and Lamb waves.

Figure 3A:
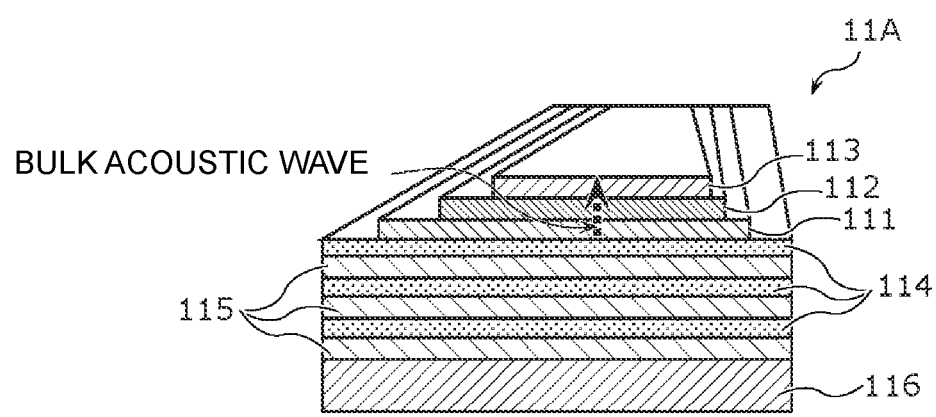
FIG. 3A is a schematic perspective view illustrating a first example of the structure of a first filter of the exemplary embodiment.

FIG. 3A is a schematic perspective view illustrating a first example (filter 11A) of the structure of the first filter of the exemplary embodiment. In FIG. 3A, one of one or more BAW resonators forming the filter 11A is shown. Each of one or more BAW resonators forming the filter 11A is a solidly mounted resonator (SMR). As illustrated in FIG. 3A, the BAW resonator, which is an SMR (hereinafter called the SMR BAW resonator), includes a silicon (Si) substrate 116, a bottom electrode 111, a top electrode 113, a piezoelectric layer 112, low acoustic impedance films 114, and high acoustic impedance films 115, for example. The Si substrate 116 is an example of a support substrate. An acoustic multilayer film constituted by the low acoustic impedance films 114 and the high acoustic impedance films 115 alternately stacked on each other is disposed above the Si substrate 116. The bottom electrode 111 is disposed above the acoustic multilayer film. The top electrode 113 is disposed above the bottom electrode 111. The piezoelectric layer 112 is disposed between the bottom electrode 111 and the top electrode 113. With this structure, by utilizing Bragg reflection of the acoustic multilayer film disposed between the Si substrate 116 and a set of the bottom electrode 111, the top electrode 113, and the piezoelectric layer 112, the SMR BAW resonator traps BAWs above the acoustic multilayer film.

With the above-described configuration, when a radio-frequency signal is input between the bottom electrode 111 and the top electrode 113, a potential difference is generated between the bottom electrode 111 and the top electrode 113. This causes the piezoelectric layer 112 to distort so as to generate a BAW in the stacking direction of the bottom electrode 111, the piezoelectric layer 112, and the top electrode 113. The film thickness of the piezoelectric layer 112 and the wavelength of the pass band of the filter 11A are preset to correspond to each other. This allows a radio-frequency signal only having target frequency components to pass through the filter 11A.

Figure 3B:
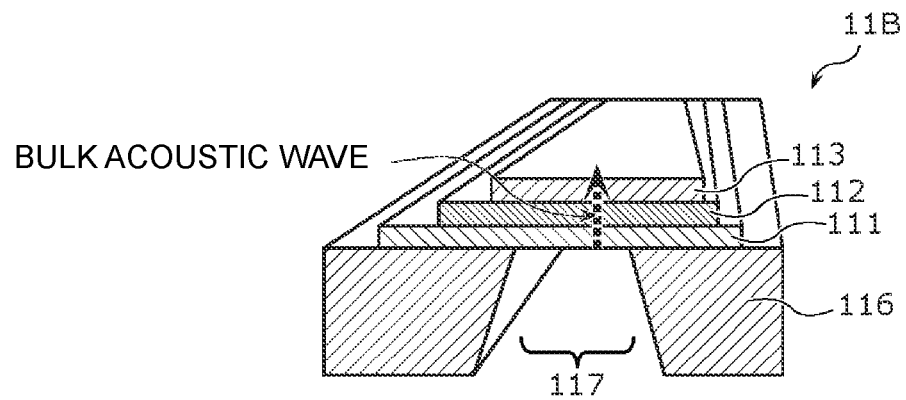
FIG. 3B is a schematic perspective view illustrating a second example of the structure of the first filter of the exemplary embodiment.

FIG. 3B is a schematic perspective view illustrating a second example (filter 11B) of the structure of the first filter of the exemplary embodiment. In FIG. 3B, one of one or more BAW resonators forming the filter 11B is shown. Each of one or more BAW resonators forming the filter 11B is a film bulk acoustic resonator (FBAR). As illustrated in FIG. 3B, the BAW resonator, which is an FBAR (hereinafter called the FBAR BAW resonator), includes a Si substrate 116, a bottom electrode 111, a top electrode 113, and a piezoelectric layer 112, for example. The Si substrate 116 is an example of the support substrate. The bottom electrode 111 is disposed above the Si substrate 116. The top electrode 113 is disposed above the bottom electrode 111. The piezoelectric layer 112 is disposed between the bottom electrode 111 and the top electrode 113. The filter 11B also has a cavity 117 formed in the Si substrate 116. With this structure, a BAW to be excited between the bottom electrode 111 and the top electrode 113 is generated in the stacking direction of the bottom electrode 111, the piezoelectric layer 112, and the top electrode 113.

With the above-described configuration, when a radio-frequency signal is input between the bottom electrode 111 and the top electrode 113, a potential difference is generated between the bottom electrode 111 and the top electrode 113. This causes the piezoelectric layer 112 to distort so as to generate a BAW in the stacking direction of the bottom electrode 111, the piezoelectric layer 112, and the top electrode 113. The film thickness of the piezoelectric layer 112 and the wavelength of the pass band of the filter 11B are preset to correspond to each other. This allows a radio-frequency signal only having target frequency components to pass through the filter 11B.

The piezoelectric layer 112 of each of the filters 11A and 11B is a lithium tantalate single crystal or a lithium niobate single crystal cut at predetermined cut angles, for example.

The filter 11 may be constituted by an SMR BAW resonator. For the SMR BAW resonator, the provision of the cavity 117 in the Si substrate 116 is not necessary, unlike for an FBAR BAW resonator, thereby making it possible to simplify the manufacturing process for the multiplexer 10.

The filter 11 may be constituted by an FBAR BAW resonator. The FBAR allows the piezoelectric layer 112 to freely vibrate because of the provision of the cavity 117, thereby enhancing the resonance Q factor. This can reduce the insertion loss of the filter 11, which further leads to a smaller transmission loss of the multiplexer 10.

3. Signal Distortion Resistance of Multiplexer 10

In the radio-frequency module 1, when a first transmitted signal (frequency f1) of the first band output from the power amplifier 21 and a second transmitted signal (frequency f2) of the second band output from the power amplifier 22 are being transmitted simultaneously, the transmitted signal from one of the amplifiers 21 and 22 may leak to the other one of the amplifiers 22 and 21 (or the corresponding filter 12 or 11). Then, the transmitted signal from the amplifier 21 or 22 having leaked to the other amplifier 22 or 21 (or the filter 12 or 11) and the transmitted signal of the other amplifier 22 or 21 (or the filter 12 or 11) are mixed in the filter 12 or 11 and the amplifier 22 or 21, thereby causing the occurrence of intermodulation distortion (hereinafter may simply be called IMD). Additionally, the first transmitted signal output from the power amplifier 21 causes the occurrence of harmonic distortion (hereinafter may simply be called HD) due to the nonlinear operation of the power amplifier 21 and the filter 11. The second transmitted signal output from the power amplifier 22 also causes the occurrence of HD due to the nonlinear operation of the power amplifier 22 and the filter 12. The IMD and the HD will collectively be called unwanted waves of distortion modes. Among unwanted waves of distortion modes, the power level of unwanted waves of the second-, third-, and fourth-order distortion modes are higher than that of unwanted waves of the other orders.

If a signal having the frequency of an unwanted wave of one of major distortion modes, that is, the second-, third-, and fourth-order distortion modes, flows into the signal path of the radio-frequency module 1, the radio-frequency module 1 fails to satisfy a predetermined level of the signal quality or the receive sensitivity of the radio-frequency module 1 is lowered.

To address unwanted waves of the above-described major distortion modes, the multiplexer 10 has the following characteristics.

The filter 12 constituted by one or more SAW resonators is capable of reducing the occurrence of unwanted waves of the second- and fourth-order distortion modes. In a BAW resonator, the crystal symmetry is broken at one side of the piezoelectric layer close to the top electrode and at the other side close to the bottom electrode, which disturbs the uniformity of the electric field distribution. Hence, the BAW resonator is not highly capable of reducing unwanted waves of the even-order distortion modes. In contrast, regarding a SAW resonator having an IDT electrode constituted by a pair of comb-shaped electrodes, adjacent electrode fingers of each of the comb-shaped electrodes have opposite polarities (phases). The SAW resonator can thus propagate a SAW by canceling out unwanted waves of even-order distortion modes.

The filter 11 constituted by one or more BAW resonators is capable of reducing the occurrence of unwanted waves of the third-order distortion mode. While power is concentrated on the electrode fingers of the comb-shaped electrodes of a SAW resonator, power is distributed over the entirety of the piezoelectric layer of a BAW resonator, which makes it difficult to cause nonlinear distortion. A BAW resonator is thus capable of reducing unwanted waves of the odd-order distribution modes rather than those of the even-order distribution modes.

4. Signal Propagation State of Radio-Frequency Module 1

Figure 4A:
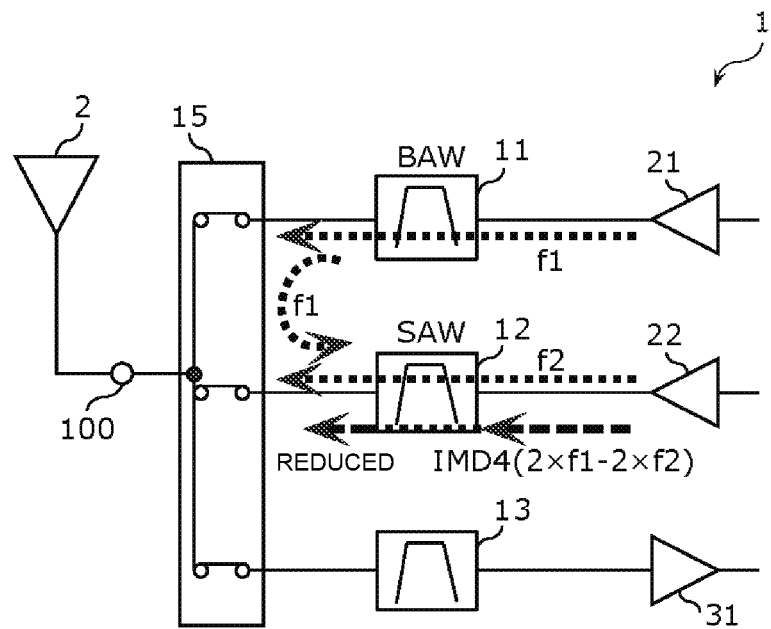
FIG. 4A illustrates a propagation state of a transmitted signal and an unwanted wave of the fourth-order distortion mode in the radio-frequency module of the exemplary embodiment.

FIG. 4A illustrates a propagation state of a transmitted signal and an unwanted wave of the fourth-order distortion mode in the radio-frequency module 1 of the exemplary embodiment. More specifically, FIG. 4A illustrates a state in which the first transmitted signal (frequency f1) output from the power amplifier 21 flows into the filter 12 or the power amplifier 22 via the switch 15, thereby generating IMD4 (2×f1−2×f2), together with the second transmitted signal (frequency f2) output from the power amplifier 22. The frequency of IMD4 is included in the second pass band of the filter 12. An unwanted wave of IMD4 is thus output from the antenna connecting terminal 100, together with the second transmitted signal. As described above, however, the filter 12 constituted by one or more SAW resonators is capable of reducing the occurrence of unwanted waves of the second- and fourth-order distortion modes. The above-described unwanted wave of IMD4 is thus less likely to output from the filter 12.

Figure 4B:
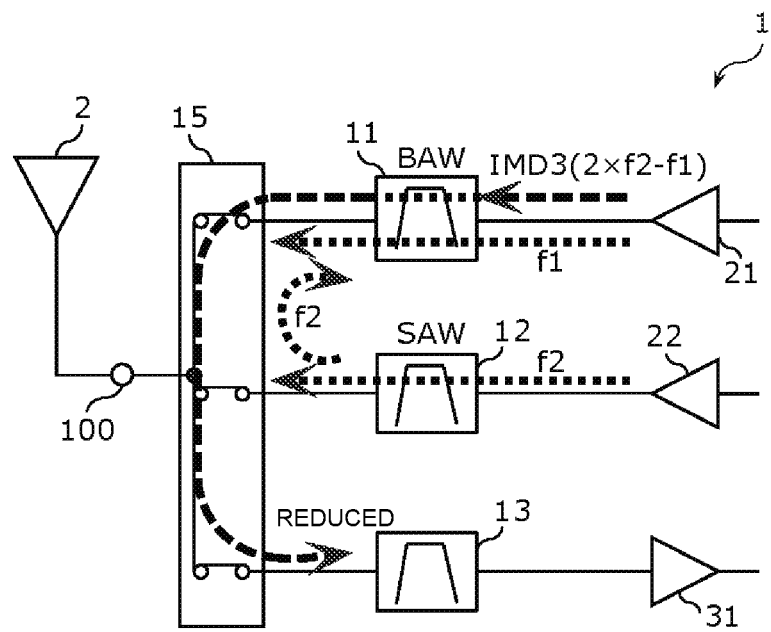
FIG. 4B illustrates a propagation state of a transmitted signal and an unwanted wave of the third-order distortion mode in the radio-frequency module of the exemplary embodiment.

FIG. 4B illustrates a propagation state of a transmitted signal and an unwanted wave of the third-order distortion mode in the radio-frequency module 1 of the exemplary embodiment. More specifically, FIG. 4B illustrates a state in which the second transmitted signal (frequency f2) output from the power amplifier 22 flows into the filter 11 or the power amplifier 21 via the switch 15, thereby generating IMD3 (2×f2−f1), together with the first transmitted signal (frequency f1) output from the power amplifier 21. The frequency of IMD3 is included in the third pass band of the filter 13. An unwanted wave of IMD3 thus flows into the low-noise amplifier 31 via the switch 15 and the filter 13. As described above, however, the filter 11 constituted by one or more BAW resonators is capable of reducing the occurrence of unwanted waves of the third-order distortion mode. The above-described unwanted wave of IMD3 is thus less likely to output from the filter 11.

That is, in the multiplexer 10 according to the exemplary embodiment, the frequency of an unwanted wave of the second- or fourth-order distortion mode, which is generated when the first transmitted signal of the first band and the second transmitted signal of the second band are simultaneously transmitted, is included in at least one of the first pass band, second pass band, and third pass band. Additionally, the frequency of an unwanted wave of the third-order distortion mode, which is generated when the first transmitted signal of the first band and the second transmitted signal of the second band are simultaneously transmitted, is included in at least one of the first pass band, second pass band, and third pass band.

Nevertheless, the multiplexer 10 includes the filter 12 having a higher capability to reduce the occurrence of unwanted waves of the second- and fourth-order distortion modes than the filter 11 and also includes the filter 11 having a higher capability to reduce the occurrence of unwanted waves of the third-order distortion mode than the filter 12. The multiplexer 10 can thus smoothen and reduce unwanted waves of multiple major (second-, third-, and fourth-order) distortion modes.

Table 1 illustrates examples of the combination of the first band, second band, and third band and IMD2, IMD3, and IMD 4 that are generated in accordance with the combination of the first band, second band, and third band (or fourth band).

quency of IMD2 is included in the third band. The frequency of IMD3 is included in the third band. The frequencies of IMD4 are included in the first band and the second band.

In example 3 shown in Table 1, the first band is 5G-NR n77, the second band is 5G-NR n41 (2.496 to 2.690 GHz), and the third band is 5G-NR n46. In example 3, when the first transmitted signal and the second transmitted signal are simultaneously transmitted, IMD3 and IMD4 are generated. The frequency of IMD3 is included in the third band. The frequencies of IMD4 are included in the first band and the second band.

In example 4 shown in Table 1, the first band is 5G-NR n41, the second band is 5G-NR n40 (2.3 to 2.4 GHz), and the third band is 5G-NR n79 (4.4 to 5.0 GHz). In example 4, when the first transmitted signal and the second transmitted signal are simultaneously transmitted, IMD3 and IMD4 are generated. The frequencies of IMD3 are included in the first band and the second band. The frequency of IMD4 is included in the third band.

In example 5 shown in Table 1, the first band is 5G-NR n79, the second band is 5G-NR n77 or 5G-NR n78, and the

TABLE 1

| Example | First band f1 GHz | Second band f2 GHZ | Third band or fourth band | IMD2 (GHz) | IMD3 (GHz) | IMD4 (GHz) |
|---|---|---|---|---|---|---|
| 1 | n46 5.55 | n77 n78 3.7 | B3 | B3-Rx(f1-f2) 1.85(5.55-3.7) | B3-Rx(2f2-f1) 1.85(2 × 3.7-5.55) | n77/n78(2f1-2f2) 3.7(2 × 5.55-2 × 3.7) n46(3f2-f1) 5.55(3 × 3.7-5.55) |
| 2 | n46 5.8 | n77 3.85 | B2 | B2-Rx(f1-f2) 1.95(5.8-3.85) | B2-Tx(2f2-f1) 1.9(2 × 3.85-5.8) | n77(2f1-2f2) 3.9(2 × 5.8-2 × 3.85) n46(3f2-f1) 5.75(3 × 3.85-5.8) |
| 3 | n77 3.84 | n41 2.5 | n46 | | n46(2f1-f2) 5.18(2 × 3.84-2.5) | n41(2f1-2f2) 2.68(2 × 3.84-2 × 2.5) n77(3f2-f1) 3.66(3 × 2.5-3.84) |
| 4 | n41 2.5 | n40 2.4 | n79 | | n40(2f2-f1) 2.3(2 × 2.4-2.5) n41(2f1-f2) 2.6(2 × 2.5-2.4) | n79(3f2-f1) 4.7(3 × 2.4-2.5) |
| 5 | n79 4.8 | n77 n78 3.6 | WLAN n40 | | n40(2f2-f1) 2.4(2 × 3.6-4.8) WLAN(2f1-f2) 6.0(2 × 4.8-3.6) | n40(2f1-2f2) 2.4(2 × 4.8-2 × 3.6) WLAN(3f2-f1) 6.0(3 × 3.6-4.8) |
| 6 | n46 5.26 | n77 4.2 | WLAN B1 | | WLAN(2f1-f2) 6.32(2 × 5.26-4.2) | B1Rx(2f1-2f2) 2.12(2 × 5.26-2 × 4.2) |
| 7 | n46 5.78 | n79 4.9 | WLAN n77 B1 | | n77(2f2-f1) 4.02(2 × 4.9-5.78) WLAN(2f1-f2) 6.66(2 × 5.78-4.9) | B1Tx(2f1-2f2) 1.76(2 × 5.78-2 × 4.9) |
| 8 | n96 6.28 | n46 5.2 | n77 B1 | | n77(2f2-f1) 4.12(2 × 5.2-6.28) | B1Rx(2f1-2f2) 2.16(2 × 6.28-2 × 5.2) |

In example 1 shown in Table 1, the first band is 5G-NR n46 (5.150 to 5.925 GHz), the second band is 5G-NR n77 (3.3 to 4.2 GHz) or 5G-NR n78 (3.3 to 3.8 GHz), and the third band is LTE Band 3. In example 1, when the first transmitted signal and the second transmitted signal are simultaneously transmitted, IMD2, IMD3, and IMD4 are generated. The frequency of IMD2 is included in the third band. The frequency of IMD3 is included in the third band. The frequencies of IMD4 are included in the first band and the second band.

In example 2 shown in Table 1, the first band is 5G-NR n46, the second band is 5G-NR n77, and the third band is LTE Band 2. In example 2, when the first transmitted signal and the second transmitted signal are simultaneously transmitted, IMD2, IMD3, and IMD4 are generated. The frethird band is 5G-NR n40 or WLAN. In example 5, when the first transmitted signal and the second transmitted signal are simultaneously transmitted, IMD3 and IMD4 are generated. The frequency of IMD3 is included in the third band. The frequency of IMD4 is included in the third band.

In addition to the filters 11, 12, and 13, the multiplexer 10 according to the exemplary embodiment may include a fourth filter connected to the antenna connecting terminal 100 and having a fourth pass band including a fourth band. The frequency of an unwanted wave of the second- or fourth-order distortion mode, which is generated when the first transmitted signal of the first band and the second transmitted signal of the second band are simultaneously transmitted, may be included in at least one of the first pass band, second pass band, third pass band, and fourth pass band. The frequency of an unwanted wave of the third-order distortion mode, which is generated when the first transmitted signal of the first band and the second transmitted signal of the second band are simultaneously transmitted, may be included in at least one of the first pass band, second pass band, third pass band, and fourth pass band.

With the above-described configuration, too, the multiplexer 10 can reduce unwanted waves of multiple major (second-, third-, and fourth-order) distortion modes.

In the above-described configuration, in example 6 shown in Table 1, the first band is 5G-NR n46, the second band is 5G-NR n77 or 5G-NR n78, the third band is WLAN, and the fourth band is LTE Band 1. In example 6, when the first transmitted signal and the second transmitted signal are simultaneously transmitted, IMD3 and IMD4 are generated. The frequency of IMD3 is included in the third band. The frequency of IMD4 is included in the fourth band.

In example 7 shown in Table 1, the first band is 5G-NR n46, the second band is 5G-NR n79, the third band is WLAN or 5G-NR n77, and the fourth band is LTE Band 1. In example 7, when the first transmitted signal and the second transmitted signal are simultaneously transmitted, IMD3 and IMD4 are generated. The frequency of IMD3 is included in the third band. The frequency of IMD4 is included in the fourth band.

In example 8 shown in Table 1, the first band is 5G-NR n96 (5.925 to 6.425 GHz), the second band is 5G-NR n46, the third band is 5G-NR n77, and the fourth band is LTE Band 1. In example 8, when the first transmitted signal and the second transmitted signal are simultaneously transmitted, IMD3 and IMD4 are generated. The frequency of IMD3 is included in the third band. The frequency of IMD4 is included in the fourth band.

5. SMR BAW Filter

The structure of the multiplexer 10 whose filter 11 is constituted by one or more SMR BAW resonators will now be explained below.

Figure 5:
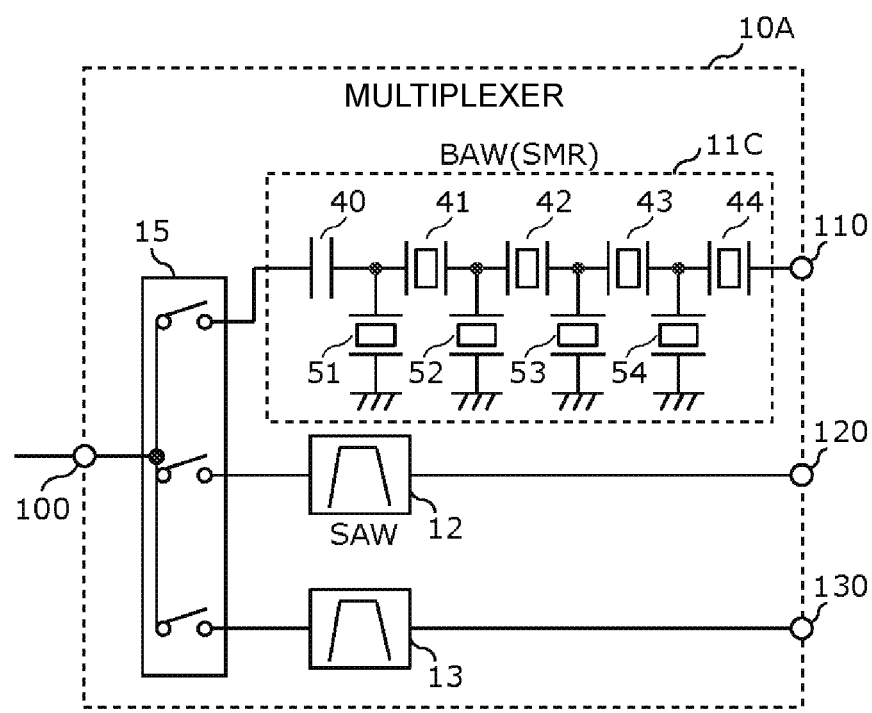
FIG. 5 is a circuit diagram of a multiplexer according to a first modified example of the exemplary embodiment.

FIG. 5 is a circuit diagram of a multiplexer 10A according to a first modified example of the exemplary embodiment. As illustrated in FIG. 5, the multiplexer 10A includes filters 11C, 12, and 13, a switch 15, and an antenna connecting terminal 100. The multiplexer 10A of the first modified example is different from the multiplexer 10 only in the configuration of the filter 11C, which is a BAW filter. The multiplexer 10A of the first modified example will be described below with reference to FIG. 5 mainly by referring to the points different from the multiplexer 10 of the exemplary embodiment while an explanation of the components configured similarly to those of the multiplexer 10 is omitted.

The filter 11C includes a capacitor element 40, series arm resonators 41, 42, 43, and 44, and parallel arm resonators 51, 52, 53, and 54.

The series arm resonators 41, 42, 43, and 44 are disposed on a series arm path connecting a first selection terminal of the switch 15 and the radio-frequency input terminal 110. The parallel arm resonators 51, 52, 53, and 54 are each disposed on a parallel arm path connecting a node of the series arm path and a ground. Each of the series arm resonators 41 through 44 and the parallel arm resonators 51 through 54 is an SMR.

The capacitor element 40 is connected between the first selection terminal of the switch 15 and the series arm resonator 41, which is connected at the closest position to the first selection terminal of the switch 15 among the series arm resonators 41 through 44, and the parallel arm resonator 51, which is connected at the closest position to the first selection terminal of the switch 15 among the parallel arm resonators 51 through 54.

The capacitor element 40, which has a lower nonlinearity than acoustic wave resonators, is disposed most closely to the antenna connecting terminal 100. Arranging the capacitor element 40 in this manner can effectively reduce a leakage of unwanted waves of distortion modes from the filter 11C toward the antenna connecting terminal 100.

Figure 6A:
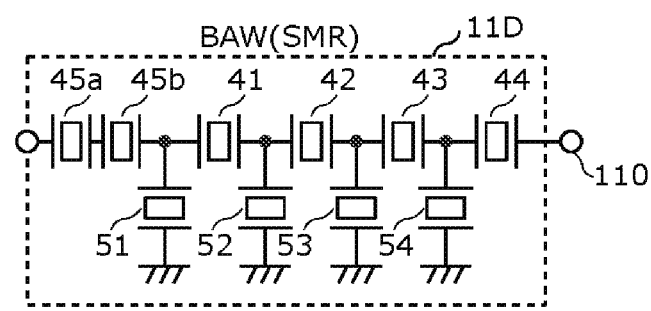
FIG. 6A is a circuit diagram of the first filter according to a second modified example of the exemplary embodiment.

FIG. 6A is a circuit diagram of a filter 11D (an example of the first filter) according to a second modified example of the exemplary embodiment. As illustrated in FIG. 6A, the filter 11D includes divided resonators 45a and 45b, series arm resonators 41, 42, 43, and 44, and parallel arm resonators 51, 52, 53, and 54. The filter 11D of the second modified example is different from the filter 11C of the first modified example in that the divided resonators 45a and 45b are provided instead of the capacitor element 40. The filter 11D of the second modified example will be described below with reference to FIG. 6A mainly by referring to the points different from the filter 11C of the first modified example while an explanation of the components configured similarly to those of the filter 11C is omitted.

The divided resonators 45a and 45b are connected in series between the first selection terminal of the switch 15 and the series arm resonator 41. No circuit element, such as a parallel arm resonator, is connected to a node of the divided resonators 45a and 45b. The divided resonators 45a and 45b, which are SMRs, are obtained by dividing a single series arm resonator in series.

That is, the divided resonators 45a and 45b are resonators connected at the closest position to the first selection terminal of the switch 15 among the divided resonators 45a and 45b, the series arm resonators 41 through 44, and the parallel arm resonators 51 through 54.

Arranging the divided resonators 45a and 45b in this manner can reduce the power density of the resonator connected at the closest position to the antenna connecting terminal 100. A radio-frequency signal to be output from the filter 11D toward the antenna connecting terminal 100 is thus less likely to become nonlinear, thereby making it possible to effectively reduce a leakage of unwanted waves of distortion modes from the filter 11D.

Figure 6B:
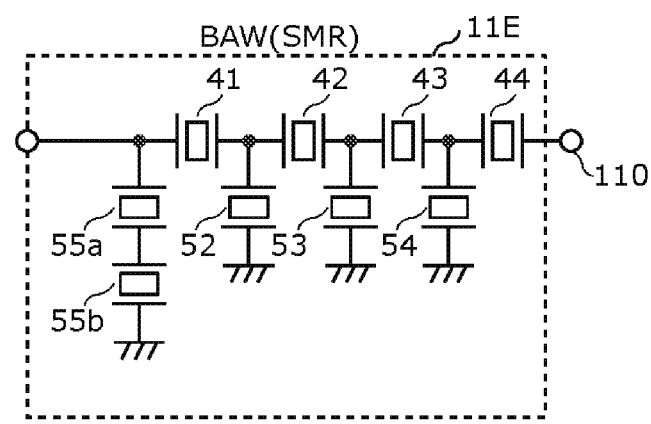
FIG. 6B is a circuit diagram of the first filter according to a third modified example of the exemplary embodiment.

FIG. 6B is a circuit diagram of a filter 11E (an example of the first filter) according to a third modified example of the exemplary embodiment. As illustrated in FIG. 6B, the filter 11E includes divided resonators 55a and 55b, series arm resonators 41, 42, 43, and 44, and parallel arm resonators 52, 53, and 54. The filter 11E of the third modified example is different from the filter 11D of the second modified example in that the divided resonators 45a and 45b are not provided and the parallel arm resonator 51 is replaced by the divided resonators 55a and 55b. The filter 11E of the third modified example will be described below with reference to FIG. 6B mainly by referring to the points different from the filter 11C of the first modified example while an explanation of the components configured similarly to those of the filter 11C is omitted.

The divided resonators 55a and 55b are connected in series between a ground and a series arm path connecting the first selection terminal of the switch 15 and the series arm resonator 41. No circuit element is connected to a node of the divided resonators 55a and 55b. The divided resonators 55a and 55b, which are SMRs, are obtained by dividing the single parallel arm resonator 51 in series.

That is, the divided resonators 55a and 55b are resonators connected at the closest position to the first selection terminal of the switch 15 among the divided resonators 55a and 55b, the series arm resonators 41 through 44, and the parallel arm resonators 52 through 54.

Arranging the divided resonators 55a and 55b in this manner can reduce the power density of the resonator connected at the closest position to the antenna connecting terminal 100. A radio-frequency signal to be output from the filter 11E toward the antenna connecting terminal 100 is thus less likely to become nonlinear, thereby making it possible to effectively reduce a leakage of unwanted waves of distortion modes from the filter 11E.

A filter 11F according to a fourth modified example includes series arm resonators 41, 42, 43, and 44 and parallel arm resonators 51, 52, 53, and 54, though it is not shown. The filter 11F of the fourth modified example is different from the filter 11C of the first modified example in that the capacitor element 40 is not provided and the configuration of the piezoelectric layer forming each BAW resonator is different from that of the filter 11C. The filter 11F of the fourth modified example will be described below mainly by referring to the points different from the filter 11C of the first modified example while an explanation of the components configured similarly to those of the filter 11C is omitted.

The relative dielectric constant of the piezoelectric layer 112 of the series arm resonator 41 or the parallel arm resonator 51 connected at the closest position to the first selection terminal of the switch 15 is lower than that of the other resonators.

This can increase the area of the electrode of the series arm resonator 41 or the parallel arm resonator 51, which is connected at the closest position to the first selection terminal of the switch 15, thereby reducing the power density of the series arm resonator 41 or the parallel arm resonator 51. A radio-frequency signal to be output from the filter 11F toward the antenna connecting terminal 100 is thus less likely to become nonlinear, thereby making it possible to effectively reduce a leakage of unwanted waves of distortion modes from the filter 11F.

In the filters 11C through 11F, one or more desired number of series arm resonators and one or more desired number of parallel arm resonators may be provided.

In the multiplexer 10, the relative dielectric constant of the piezoelectric layer 112 (first piezoelectric layer) of the BAW resonator forming the filter 11 may be higher than that of the piezoelectric substrate 121 (second piezoelectric layer) of the SAW resonator forming the filter 12.

Lowering the relative dielectric constant of the piezoelectric substrate 121 of the filter 12 can increase the area of the SAW resonator of the filter 12, thereby enhancing the electric power handling capability. On the other hand, increasing the relative dielectric constant of the piezoelectric layer 112 of the filter 11 can decrease the area of the BAW resonator forming the filter 11. With this configuration, the multiplexer 10 can reduce the occurrence of unwanted waves of multiple major distortion modes without making the total area of the filters 11 and 12 large.

6. Layout of Radio-Frequency Module 1

The arrangement layout of circuit components forming the radio-frequency module 1 will be discussed below.

Figure 7:
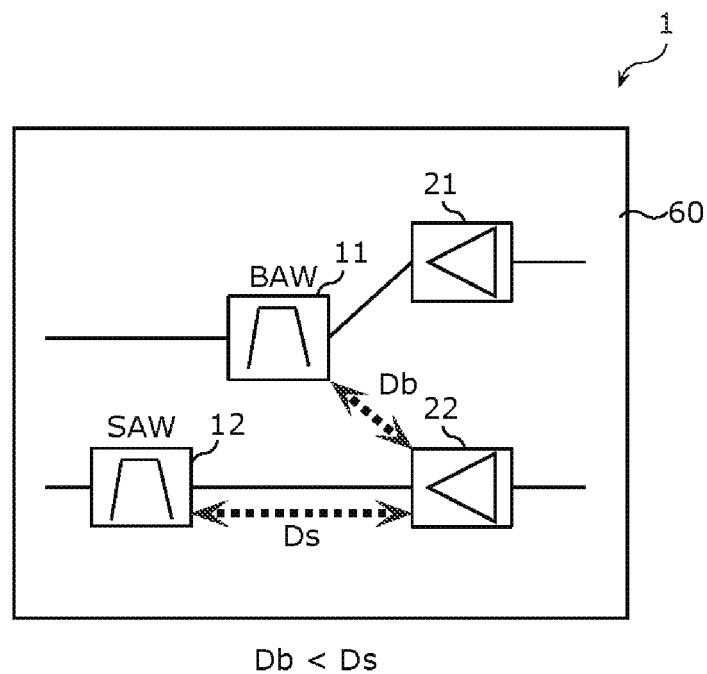
FIG. 7 is a schematic plan view illustrating the arrangement layout of acoustic wave filters and power amplifiers of the radio-frequency module according to the exemplary embodiment.

FIG. 7 is a schematic plan view illustrating the arrangement layout of the filters 11 and 12 and the power amplifiers 21 and 22 of the radio-frequency module 1 according to the exemplary embodiment.

As illustrated in FIG. 7, the radio-frequency module 1 includes a module substrate 60 in addition to the components of the radio-frequency module 1 shown in FIG. 1.

The module substrate 60 is a substrate used for mounting the filters 11 and 12 and the power amplifiers 21 and 22 on its main surface. Examples of the module substrate 60 are a low temperature co-fired ceramics (LTCC) substrate, a high temperature co-fired ceramics (HTCC) substrate, a component-embedded substrate, a substrate having a redistribution layer (RDL), and a printed substrate, each of which has a multilayer structure constituted by plural dielectric layers.

As illustrated in FIG. 7, when the main surface of the module substrate 60 is viewed from above, the distance Db between the filter 11 and the power amplifier 22 is smaller than the distance Ds between the filter 12 and the power amplifier 22.

The absolute value of the temperature coefficient of frequency of the filter 12 constituted by one or more SAW resonators is larger than that of the filter 11 constituted by one or more BAW resonators. That is, the shift amount of the frequency in response to a temperature change in the filter 12 is greater than that in the filter 11. With the above-described layout of the radio-frequency module 1, the distance between the filter 12 and the power amplifier 22 is relatively large, thereby making it possible to regulate the shift amount of the frequency in the filter 12 in response to a temperature rise of the radio-frequency module 1 caused by heat generated in the power amplifier 22 to a smaller level. The radio-frequency module 1 is thus able to achieve signal transmission with a smaller loss.

The distance between the filter 11 and the power amplifier 22 is relatively small. A protection film made of silicon dioxide as a main constituent is formed for the filter 11, thereby regulating the shift amount of the frequency in the filter 11 in response to a temperature change to a smaller level.

The Si substrate 116 forming the filter 11 and the piezoelectric substrate 121 forming the filter 12 may be stacked on each other in the same package. This can reduce the size of the radio-frequency module 1.

In this case, when the package is seen in cross section, the distance of the filter 12 to the power amplifier 22 is larger than that of the filter 11 to the power amplifier 22, thereby making it possible to regulate the shift amount of the frequency in the filter 12. Alternatively, the filter 11 is placed at a position closer to the surface to be mounted on the module substrate 60 than the filter 12 is, so that the distance of the filter 12 to the power amplifier 22 becomes larger than that of the filter 11 to the power amplifier 22. This can regulate the shift amount of the frequency in the filter 12.

Advantages and Others

The multiplexer 10 according to the exemplary embodiment includes the filters 11, 12, and 13. The filter 11 is connected to the antenna connecting terminal 100 and has a first pass band including a first band which can be used for sending (transmitting) a signal. The filter 12 is connected to the antenna connecting terminal 100. The filter 12 has a second pass band including a second band which is positioned at a lower frequency side than the first band and which can be used for sending (transmitting) a signal. The filter 13 is connected to the antenna connecting terminal 100 and has a third pass band including a third band. The frequency of an unwanted wave of the second- or fourth-order distortion mode, which is generated when a first transmitted signal of the first band and a second transmitted signal of the second band are simultaneously transmitted, is included in at least one of the first pass band, second pass band, and third pass band. The frequency of an unwanted wave of the third-order distortion mode, which is generated when the first transmitted signal of the first band and the second transmitted signal of the second band are simultaneously transmitted, is included in at least one of the first pass band, second pass band, and third pass band. The filter 11 is a BAW filter, while the filter 12 is a SAW filter.

The filter 12 constituted by a SAW resonator is capable of reducing the occurrence of unwanted waves of the second- and fourth-order distortion modes. This can make it less likely to output unwanted waves of the second- and fourth-order distortion modes from the filter 12. In contrast, the filter 11 constituted by a BAW resonator is capable of reducing the occurrence of unwanted waves of the third-order distortion mode. This can make it less likely to output unwanted waves of the third-order distortion mode from the filter 11.

The multiplexer 10 includes the filter 12 having a higher capability to reduce the occurrence of unwanted waves of the second- and fourth-order distortion modes than the filter 11 and also includes the filter 11 having a higher capability to reduce the occurrence of unwanted waves of the third-order distortion mode than the filter 12. The multiplexer 10 can thus reduce unwanted waves of multiple major (second-, third-, and fourth-order) distortion modes. The multiplexer 10 can also smoothen and reduce unwanted waves of multiple major (second-, third-, and fourth-order) distortion modes.

The filter 11 may include one or more BAW resonators, each of which may be an FBAR.

The FBAR allows the piezoelectric layer 112 to freely vibrate because of the provision of the cavity 117, thereby enhancing the resonance Q factor. This can reduce the insertion loss of the filter 11, which further leads to a smaller transmission loss of the multiplexer 10.

The filter 11A may include one or more BAW resonators, each of which may be an SMR.

For the SMR, the provision of the cavity 117 in the Si substrate 116 is not necessary, unlike for the FBAR, thereby making it possible to simplify the manufacturing process for the multiplexer 10.

The filter 11C may include the series arm resonators 41 through 44, the parallel arm resonators 51 through 54, and the capacitor element 40. The series arm resonators 41 through 44 are disposed on a series arm path connecting the antenna connecting terminal 100 and the radio-frequency input terminal 110 used for receiving the first transmitted signal. The parallel arm resonators 51 through 54 are each disposed on a parallel arm path connecting a node of the series arm path and a ground. The capacitor element 40 is connected between the antenna connecting terminal 100 and the resonator which is connected at the closest position to the antenna connecting terminal 100 among the series arm resonators 41 through 44 and the parallel arm resonators 51 through 54.

The capacitor element 40, which has a lower nonlinearity than acoustic wave resonators, is connected at the closest position to the antenna connecting terminal 100. This can effectively reduce a leakage of unwanted waves of distortion modes from the filter 11C toward the antenna connecting terminal 100.

In the filters 11D and 11E, the resonator connected at the closest position to the antenna connecting terminal 100 among one or more BAW resonators may be constituted by plural divided resonators connected in series with each other.

This can reduce the power density of the resonator connected at the closest position to the antenna connecting terminal 100. Radio-frequency signals to be output from the filters 11D and 11E toward the antenna connecting terminal 100 are thus less likely to become nonlinear, thereby making it possible to effectively reduce a leakage of unwanted waves of distortion modes from the filters 11D and 11E.

In the filter 11F, each of one or more BAW resonators may include the Si substrate 116, the bottom electrode 111 disposed above the Si substrate 116, the top electrode 113 disposed above the bottom electrode 111, and the piezoelectric layer 112 disposed between the bottom electrode 111 and the top electrode 113. Among one or more BAW resonators, the relative dielectric constant of the piezoelectric layer 112 of the resonator connected at the closest position to the antenna connecting terminal 100 may be lower than that of the other resonators.

This can increase the area of the electrode of the resonator which is connected at the closest position to the antenna connecting terminal 100, thereby reducing the power density of the resonator. A radio-frequency signal to be output from the filter 11F toward the antenna connecting terminal 100 is thus less likely to become nonlinear, thereby making it possible to effectively reduce a leakage of unwanted waves of distortion modes from the filter 11F.

In the multiplexer 10, the filter 11 may include one or more BAW resonators. Each of one or more BAW resonators may include the Si substrate 116, the bottom electrode 111 disposed above the Si substrate 116, the top electrode 113 disposed above the bottom electrode 111, and the piezoelectric layer 112 (first piezoelectric layer) disposed between the bottom electrode 111 and the top electrode 113. The filter 12 may include one or more SAW resonators. Each of one or more SAW resonators may include the piezoelectric substrate 121 (second piezoelectric layer) and the IDT electrode 122 formed on the surface of the piezoelectric substrate 121. The relative dielectric constant of the piezoelectric layer 112 may be higher than that of the piezoelectric substrate 121.

Lowering the relative dielectric constant of the second piezoelectric layer of the filter 12 can increase the area of the SAW resonator of the filter 12, thereby enhancing the electric power handling capability. On the other hand, increasing the relative dielectric constant of the first piezoelectric layer of the filter 11 can decrease the area of the BAW resonator forming the filter 11. With this configuration, the multiplexer 10 can reduce the occurrence of unwanted waves of multiple major distortion modes without making the total area of the filters 11 and 12 large.

In the multiplexer 10, the first band may be 5G-NR n46, the second band may be 5G-NR n77 or 5G-NR n78, and the third band may be LTE Band 3.

In the multiplexer 10, the first band may be 5G-NR n46, the second band may be 5G-NR n77, and the third band may be LTE Band 2.

In the multiplexer 10, the first band may be 5G-NR n77, the second band may be 5G-NR n41, and the third band may be 5G-NR n46.

In the multiplexer 10, the first band may be 5G-NR n41, the second band may be 5G-NR n40, and the third band may be 5G-NR n79.

In the multiplexer 10, the first band may be 5G-NR n79, the second band may be 5G-NR n77 or 5G-NR n78, and the third band may be 5G-NR n40 or WLAN.

The radio-frequency module 1 according to the exemplary embodiment includes the multiplexer 10, the module substrate 60, and the power amplifiers 21 and 22. The multiplexer 10 is mounted on the module substrate 60. The output terminal of the power amplifier 21 is connected to the input terminal of the filter 11. The power amplifier 21 is mounted on the module substrate 60. The output terminal of the power amplifier 22 is connected to the input terminal of the filter 12. The power amplifier 22 is mounted on the module substrate 60. The distance Db between the filter 11 and the power amplifier 22 may be smaller than the distance Ds between the filter 12 and the power amplifier 22.

With this configuration, the distance Ds between the filter 12 and the power amplifier 22 is relatively large, thereby making it possible to regulate the shift amount of the frequency in the filter 12 in response to a temperature rise of the radio-frequency module 1 caused by heat generated in the power amplifier 22 to a smaller level. The radio-frequency module 1 is thus able to achieve signal transmission with a smaller loss.

The communication apparatus 5 includes the antenna 2, the RFIC 3 that processes a radio-frequency signal to be sent by the antenna 2 and a radio-frequency signal received by the antenna 2, and the multiplexer 10 or the radio-frequency module 1 that transmits the radio-frequency signals between the antenna 2 and the RFIC 3.

The communication apparatus 5 is thus able to reduce unwanted waves of multiple major distortion modes.

OTHER EMBODIMENTS

The multiplexers, radio-frequency modules, and communication apparatuses have been discussed above through illustration of the above-described exemplary embodiment and modified examples. However, the disclosure is not restricted to the above-described exemplary embodiment and modified examples. Other embodiments implemented by combining certain components in the above-described embodiment and modified examples and modified examples obtained by making various modifications to the above-described exemplary embodiment and modified examples by those skilled in the art without departing from the scope and spirit of the disclosure are also encompassed in the disclosure. Various types of equipment integrating any of the above-described multiplexers, radio-frequency modules, and communication apparatuses are also encompassed in the disclosure.

For example, in the circuit configurations of the multiplexers, radio-frequency modules, and communication apparatuses according to the above-described exemplary embodiment and modified examples, a matching element, such as an inductor and a capacitor, and a switch circuit may be connected between circuit elements. In this case, a wiring inductor constituted by wiring for connecting the circuit elements may be used as the inductor.

The present disclosure can be widely used for communication equipment, such as a cellular phone, as a multiplexer, a radio-frequency module, and a communication apparatus that can be applied to a multiband system including bands for LTE, 5G-NR, and WLAN.

What is claimed is:

1. A multiplexer comprising:
a first filter connected to a common terminal and having a first pass band including a first band to send a signal, the first filter being a bulk acoustic wave filter;
a second filter connected to the common terminal and having a second pass band including a second band, the second band being positioned at a lower frequency than the first band to send a signal, the second filter being a surface acoustic wave filter; and
a third filter connected to the common terminal and having a third pass band including a third band,
wherein a frequency of an unwanted wave of a second-order or fourth-order distortion mode, which is generated when a first transmitted signal of the first band and a second transmitted signal of the second band are simultaneously transmitted, is included in at least one of the first pass band, the second pass band, and the third pass band, and a frequency of an unwanted wave of a third-order distortion mode, which is generated when the first transmitted signal and the second transmitted signal are simultaneously transmitted, is included in at least one of the first pass band, the second pass band, and the third pass band,
the first filter includes at least one bulk acoustic wave resonator,
the at least one bulk acoustic wave resonator includes
a support substrate,
a bottom electrode disposed above the support substrate,
a top electrode disposed above the bottom electrode, and
a first piezoelectric layer disposed between the bottom electrode and the top electrode,
the second filter includes at least one surface acoustic wave resonator,
each of the at least one surface acoustic wave resonator includes
a second piezoelectric layer, and
an interdigital transducer electrode formed on a surface of the second piezoelectric layer, and
a relative dielectric constant of the first piezoelectric layer is higher than a relative dielectric constant of the second piezoelectric layer.

2. The multiplexer according to claim 1, wherein:
the first filter includes at least one bulk acoustic wave resonator, and
the at least one bulk acoustic wave resonator is a film bulk acoustic resonator (FBAR).

3. The multiplexer according to claim 1, wherein:
the at least one bulk acoustic wave resonator is a solidly mounted resonator (SMR).

4. A multiplexer comprising:
a first filter connected to a common terminal and having a first pass band including a first band to send a signal, the first filter being a bulk acoustic wave filter;
a second filter connected to the common terminal and having a second pass band including a second band, the second band being positioned at a lower frequency than the first band to send a signal, the second filter being a surface acoustic wave filter; and
a third filter connected to the common terminal and having a third pass band including a third band,
wherein a frequency of an unwanted wave of a second-order or fourth-order distortion mode, which is generated when a first transmitted signal of the first band and a second transmitted signal of the second band are simultaneously transmitted, is included in at least one of the first pass band, the second pass band, and the third pass band, and a frequency of an unwanted wave of a third-order distortion mode, which is generated when the first transmitted signal and the second transmitted signal are simultaneously transmitted, is included in at least one of the first pass band, the second pass band, and the third pass band,
the first filter includes
at least one bulk acoustic wave resonator,
at least one series arm resonator disposed on a series arm path, the series arm path connecting the common terminal and a radio-frequency input terminal configured to receive the first transmitted signal, at least one parallel arm resonator disposed on a parallel arm path, the parallel arm path connecting the series arm path and a ground, and a capacitor element connected between the common terminal and a resonator which is connected to a closest position to the common terminal among the at least one series arm resonator and the at least one parallel arm resonator.

5. The multiplexer according to claim 3, wherein a resonator which is connected to a closest position to the common terminal among the at least one bulk acoustic wave resonator is constituted by a plurality of divided resonators connected in series with each other.

6. A multiplexer comprising:
a first filter connected to a common terminal and having a first pass band including a first band to send a signal, the first filter being a bulk acoustic wave filter;
a second filter connected to the common terminal and having a second pass band including a second band, the second band being positioned at a lower frequency than the first band to send a signal, the second filter being a surface acoustic wave filter; and
a third filter connected to the common terminal and having a third pass band including a third band,
wherein a frequency of an unwanted wave of a second-order or fourth-order distortion mode, which is generated when a first transmitted signal of the first band and a second transmitted signal of the second band are simultaneously transmitted, is included in at least one of the first pass band, the second pass band, and the third pass band, and a frequency of an unwanted wave of a third-order distortion mode, which is generated when the first transmitted signal and the second transmitted signal are simultaneously transmitted, is included in at least one of the first pass band, the second pass band, and the third pass band,
the first filter includes at least one bulk acoustic wave resonator,
the at least one bulk acoustic wave resonator is a solidly mounted resonator (SMR), and
each of the at least one bulk acoustic wave resonator includes
a support substrate,
a bottom electrode disposed above the support substrate,
a top electrode disposed above the bottom electrode, and
a first piezoelectric layer disposed between the bottom electrode and the top electrode; and
a relative dielectric constant of the first piezoelectric layer of a resonator which is connected to a closest position to the common terminal among the at least one bulk acoustic wave resonator is lower than a relative dielectric constant of the first piezoelectric layer of a rest of the at least one bulk acoustic wave resonator.

7. The multiplexer according to claim 1, wherein:
the first band is n46 for 5G-NR;
the second band is n77 or n78 for 5G-NR; and
the third band is Band 3 for LTE.

8. The multiplexer according to claim 1, wherein:
the first band is n46 for 5G-NR;
the second band is n77 for 5G-NR; and
the third band is Band 2 for LTE.

9. The multiplexer according to claim 1, wherein:
the first band is n77 for 5G-NR;
the second band is n41 for 5G-NR; and
the third band is n46 for 5G-NR.

10. The multiplexer according to claim 1, wherein:
the first band is n41 for 5G-NR;
the second band is n40 for 5G-NR; and
the third band is n79 for 5G-NR.

11. The multiplexer according to claim 1, wherein:
the first band is n79 for 5G-NR;
the second band is n77 or n78 for 5G-NR; and
the third band is n40 for 5G-NR or a wireless local area network (WLAN).

12. A radio-frequency module comprising:
the multiplexer according to claim 1;
a module substrate, the multiplexer being disposed on the module substrate;
a first power amplifier disposed on the module substrate, an output terminal of the first power amplifier being connected to an input terminal of the first filter; and
a second power amplifier disposed on the module substrate, an output terminal of the second power amplifier being connected to an input terminal of the second filter,
wherein a distance between the first filter and the second power amplifier is smaller than a distance between the second filter and the second power amplifier.

13. A communication apparatus comprising:
an antenna;
a radio-frequency signal processing circuit that processes a radio-frequency signal to be sent by the antenna and a radio-frequency signal received by the antenna; and
the multiplexer according to claim 1 that transmits the radio-frequency signals between the antenna and the radio-frequency signal processing circuit.

14. A communication apparatus comprising:
an antenna;
a radio-frequency signal processing circuit that processes a radio-frequency signal to be sent by the antenna and a radio-frequency signal received by the antenna; and
the radio-frequency module according to claim 12 that transmits the radio-frequency signals between the antenna and the radio-frequency signal processing circuit.

15. The radio-frequency module according to claim 12, further comprising:
a first impedance matching circuit connected between the output terminal of the first power amplifier and the input terminal of the first filter.

16. The radio-frequency module according to claim 9, further comprising:
a second impedance matching circuit connected between the output terminal of the second power amplifier and the input terminal of the second filter.

17. The radio-frequency module according to claim 12, further comprising a switch configured to selectively connect an output terminal of one of the first, second, or third filters to an antenna connection terminal.

18. The multiplexer according to claim 6, wherein an acoustic impedance of the first piezoelectric layer is lower than an acoustic impedance of the second piezoelectric layer.

19. The multiplexer according to claim 1, wherein an acoustic impedance of the first piezoelectric layer is lower than an acoustic impedance of the second piezoelectric layer.

* * * * *